(12) United States Patent
Song et al.

(10) Patent No.: US 7,458,087 B2
(45) Date of Patent: Nov. 25, 2008

(54) OPTICAL PICKUP ACTUATOR FOR REDUCING VIBRATION

(75) Inventors: Byung-youn Song, Suwon-si (KR); Yoon-tak Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 262 days.

(21) Appl. No.: 10/706,949

(22) Filed: Nov. 14, 2003

(65) Prior Publication Data
US 2004/0098737 A1    May 20, 2004

(30) Foreign Application Priority Data
Nov. 15, 2002    (JP)    ............ 10-2002-071040

(51) Int. Cl.
G11B 7/085 (2006.01)
(52) U.S. Cl. ............................................. 720/684
(58) Field of Classification Search ........... 720/684, 720/683, 681, 682, 685, 686, 687, 688; 369/44.16, 369/44.15; 359/814, 824
See application file for complete search history.

(56) References Cited

U.S. PATENT DOCUMENTS

| | | | | |
|---|---|---|---|---|
| 5,446,721 A | * | 8/1995 | Sekimoto et al. | 720/684 |
| 5,579,176 A | * | 11/1996 | Ikegame et al. | 359/822 |
| 5,663,843 A | * | 9/1997 | Ezawa et al. | 359/824 |
| 5,666,843 A | * | 9/1997 | Muller | 72/234 |
| 5,841,593 A | * | 11/1998 | Ikegame et al. | 359/823 |
| 6,069,867 A | * | 5/2000 | Ikegame | 369/248 |
| 6,091,553 A | * | 7/2000 | Song et al. | 359/813 |
| 6,163,416 A | * | 12/2000 | Uekusa et al. | 359/813 |
| 6,510,121 B2 | * | 1/2003 | Ijima et al. | 720/684 |
| 6,968,563 B2 | * | 11/2005 | Nagai | 720/682 |
| 2001/0038581 A1 | * | 11/2001 | Kawano et al. | 369/44.16 |
| 2002/0009032 A1 | * | 1/2002 | Tsukuda et al. | 369/53.19 |
| 2002/0141323 A1 | * | 10/2002 | Horita et al. | 369/112.23 |
| 2002/0172109 A1 | * | 11/2002 | Fujita | 369/44.16 |
| 2003/0117934 A1 | * | 6/2003 | Mori et al | 369/244 |
| 2003/0193854 A1 | * | 10/2003 | Lee et al. | 369/44.16 |
| 2005/0188394 A1 | * | 8/2005 | Choi | 720/683 |

FOREIGN PATENT DOCUMENTS

| | | | |
|---|---|---|---|
| EP | 1542213 A2 | * | 6/2005 |
| JP | 8221789 | | 9/1996 |
| JP | 11306570 A | * | 11/1999 |
| KR | 20-161144 | | 8/1999 |
| KR | 2002-0087185 | | 11/2002 |

OTHER PUBLICATIONS

U.S. Appl. No. 10/179,877, filed Sep. 2002, Lee et al.*
U.S. Appl. No. 09/905,870, filed Jul. 2001, Kawaon.*

* cited by examiner

Primary Examiner—Brian E. Miller
Assistant Examiner—Matthew G Kayrish
(74) Attorney, Agent, or Firm—Staas & Halsey LLP

(57) ABSTRACT

An optical pickup actuator for driving, by a magnetic driving unit, in a focusing direction, a tracking direction, and a tilting direction, a bobbin on which an objective lens is disposed and which is movably supported by suspension wires, including at least one damping member is disposed at a position where greatest changes in the optical pickup actuator occur when driving the bobbin in the focusing direction, the tracking direction, and the tilting direction, so that a size of a second resonant peak is reduced.

18 Claims, 15 Drawing Sheets

OPTICAL PICKUP ACTUATOR FOR REDUCING VIBRATION

CROSS-REFERENCE TO RELATED APPLICATIONS

This application claims the priority of Korean Patent Application No. 2002-71040, filed on Nov. 15, 2002, in the Korean Intellectual Property Office, the disclosure of which is incorporated herein in its entirety by reference.

BACKGROUND OF THE INVENTION

1. Field of the Invention

The present invention relates to an optical pickup actuator, and more particularly, to a stable optical pickup actuator which exhibits increased gain margin and reduced vibration by employing a damping member at a position and reducing the size of a second resonant peak.

2. Description of the Related Art

Generally, optical recording and/or reproducing apparatuses for recording and/or reproducing information on and/or from an optical recording medium, that is, a disc, include an optical pickup actuator which radiates light onto a recording surface of the disc and receives light reflected from the disc while moving along a radial direction of the disc, so that information is recorded or reproduced.

Referring to FIGS. 1 and 2, in a conventional optical pickup actuator, a holder 13 is formed at one side of a base 10, and a bobbin 17 on which an objective lens 15 is placed is mounted in a central portion of the base 10. Throughholes 18 are formed at both sides of the objective lens 15 on the bobbin 17, and first magnets 20 are inserted into the through-holes 18. Second magnets 23 are installed at both sides of the bobbin 17. The first and second magnets 20 and 23 are attached to first and second yokes 25 and 27, respectively, formed on the base 10. Meanwhile, third magnets 30 are provided at both sides of the base 10 in a tracking direction T. The third magnets 30 are attached to third yokes 33 formed on the base 10.

The bobbin 17 is suspended and supported movably by suspension wires 35 that are fixed to the holder 13 at one end.

Turning now to FIG. 2, magnetic driving unit is provided for driving the bobbin 17 in a focusing direction F, the tracking direction T, and a tilting direction t. The magnetic driving unit includes tracking coils 40 wound around an inside wall of the through-hole 18, focusing coils 43 wound outside the through-hole 18, tilting coils 45 wound around both sides of the bobbin 17 in the tracking direction T, and the first to third magnets 20, 23, and 30, respectively.

When power supply is applied to the tracking coils 40, the focusing coil 43, and the tilting coils 45, the bobbin 17 operates in the focusing direction F, the tracking direction T, or the tilting direction t by an interaction between the coils 40, 43, and 45 and the first to third magnets 20, 23, and 30, respectively, so that focusing, tracking, and tilting operations of the objective lens 15 are performed.

Since the bobbin 17 is suspended by the suspension wires 35, the optical pickup actuator has a vibration characteristic. In order to measure the vibration characteristic, the optical pickup actuator constitutes an open loop with respect to a phase and a gain with respect to a frequency. FIG. 3A shows a form of a general open loop. In FIG. 3A, a frequency "a" corresponding to 0 dB indicates a 0 dB cutoff frequency, and a point p indicates a second resonant peak. A difference between a gain at the 0 dB cutoff frequency and a gain at the second resonant peak indicates a gain margin GM.

However, as the speed of recording media increases, an operation frequency increases correspondingly in focusing and tracking operations of an optical pickup, thereby generating problems of deflection and eccentricity of the recording medium. Thus, in order to employ a high-speed optical recording apparatus, problems caused by disturbances and increased acceleration of deflected and eccentric discs must be solved. In order to solve such problems, the 0 dB cutoff frequency "a" in the open loop of FIG. 3 must be increased. In order to increase the 0 dB cutoff frequency, a gain and a phase in an RF chip, a drive IC chip, and a digital equalizer (DEQ) must be changed. However, a second resonance occurs inevitably at a frequency of about 20 kHz or more due to a physical structure of the optical pickup actuator, and a gain increases greatly in a second resonance frequency area within which the second resonance occurs. Further, a gain at the second resonant peak may exceed 0 dB. In this case, a gain margin is 0.

In a case where a gain margin is reduced, it is more likely that an optical recording apparatus oscillates when disturbances having the second resonance frequency and the second resonance frequency/n (n is natural number) is input to the optical recording apparatus. Because of this oscillation possibility, the gain margin obtained from the second resonant peak in driving the high-speed optical recording medium is an important design condition in designing a controller of the optical recording apparatus.

In order to ensure a proper gain margin, there are a first method for increasing the second resonance frequency and a second method for reducing a size of the second resonant peak. As shown in FIG. 3B, attempts to ensure a proper gain margin using the first method have been made. The size of the second resonant peak decreases as the second resonance frequency increases. Thus, as shown in FIG. 3B, the gain margin is increased from GM1 to GM2 (GM1<GM2) by increasing the second resonance frequency from c to d.

However, it is difficult to significantly increase the second resonance frequency without changing the entire structure of the conventional optical pickup actuator.

A material having high rigidity is frequently used in order to increase the second resonance frequency. When the second resonance frequency is increased using the material having high rigidity, as shown in FIG. 3C, the second resonance frequency increases from e to f, but the size of the second resonant peak also increases. Consequently, the gain margin is reduced from GM3 to GM4 (GM3>GM4).

FIGS. 4A and 4B are a design view of an EQ (equalizer) with respect to the conventional optical pickup actuator. According to the design view of the equalizer, gain is increased automatically in order to overcome eccentric acceleration in recording and/or reproducing of a high-speed recording medium so that a 0 dB cutoff frequency increases. Here, a problem of the actuator becoming unstable due to the increase of the 0 dB cutoff frequency must be solved. FIG. 4B shows gain and phase after coefficients of the controller are designed to perform phase compensation for ensuring the stability of the actuator in the frequency range of 20-30 kHz where a second resonance frequency of the actuator is. FIG. 4B shows a second resonance frequency band of 20-30 kHz, and it can be seen that gain increases about a factor of 10 due to the design of the coefficients of the controller for phase compensation. This indicates that the gain margin is reduced inevitably in the second resonance frequency band.

Thus, the second method for reducing the size of the second resonant peak in the second resonance frequency band needs to be newly studied, and compared with the first method for raising the second resonance frequency in order to ensure a proper gain margin.

FIG. 5A is a graph illustrating the vibration characteristic of a 2× CD, and FIG. 5B is a graph illustrating the vibration characteristic of a 20× CD. Here, portions A and B indicate a second resonant peak. As the speed of the recording medium increases, the 0 dB cutoff frequency increases and the size of the second resonant peak increases greatly. In other words, as the speed of the recording medium increases, the gain margin is reduced greatly. Thus, it becomes increasingly essential to ensure a proper gain margin as the speed of recording media increases.

SUMMARY OF THE INVENTION

The present invention provides an optical pickup actuator for ensuring a proper gain margin and improving a vibration characteristic of a high-speed recording medium by inserting a damping member at a position and reducing the size of a second resonant peak.

Additional aspects and/or advantages of the invention will be set forth in part in the description which follows and, in part, will be obvious from the description, or may be learned by practice of the invention.

According to an aspect of the present invention, there is provided an optical pickup actuator for driving, via a magnetic driving unit, in focusing, tracking, and tilting directions, a bobbin on which an objective lens is disposed, including at least one damping member is disposed at a position where greatest changes in the optical pickup actuator occur when the magnetic driving unit drives the bobbin in one of the focusing, tracking, and tilting directions, so that a size of a second resonant peak is reduced.

The magnetic driving unit may include: first magnets which are disposed at opposing sides of the bobbin, respectively; tracking coils which are wound around the bobbin to oppose respective ones of the first magnets; second magnets which are spacedly disposed from respective ones of the first magnets, respectively; and focusing coils which are wound between the first magnets and the second magnets. A first damping member may be disposed at a center portion of the focusing coils.

The bobbin may have corners and at least one of the one or more damping members may be disposed at each corner.

A metallic heterogeneous material may be mixed with the second damping member.

According to another aspect of the present invention, there is provided an optical pickup actuator including: a base; a moving unit in which an objective lens is disposed at a side thereof and having a receiving hall at a center thereof; a damping member disposed at at least one location where changes of the actuator occur most frequently; a bobbin which is receivable in the receiving hall so as to move together with the moving unit; and a magnetic driving unit disposed in the base and which drives the moving unit in focusing, tracking, and tilting directions.

The magnetic driving unit may include: focusing coils which are wound around the bobbin; tracking coils which are wound around a side of the bobbin and are disposed at the center portion of the receiving hall; and first and second magnets disposed at sides of the tracking coils.

According to still another aspect of the present invention, there is provided a method of reducing a frequency of a second resonance peak of an optical pickup, including damping vibration of the optical pickup during tracking at at least one location where the greatest change occurs during the tracking.

According to yet another aspect of the present invention, there is provided a method of increasing a gain margin of an optical pickup, including reducing a frequency of a second resonance peak of an optical pickup by damping vibration of the optical pickup during tracking at at least one location where the greatest change occurs during the tracking.

BRIEF DESCRIPTION OF THE DRAWINGS

These and/or other aspects and/or advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
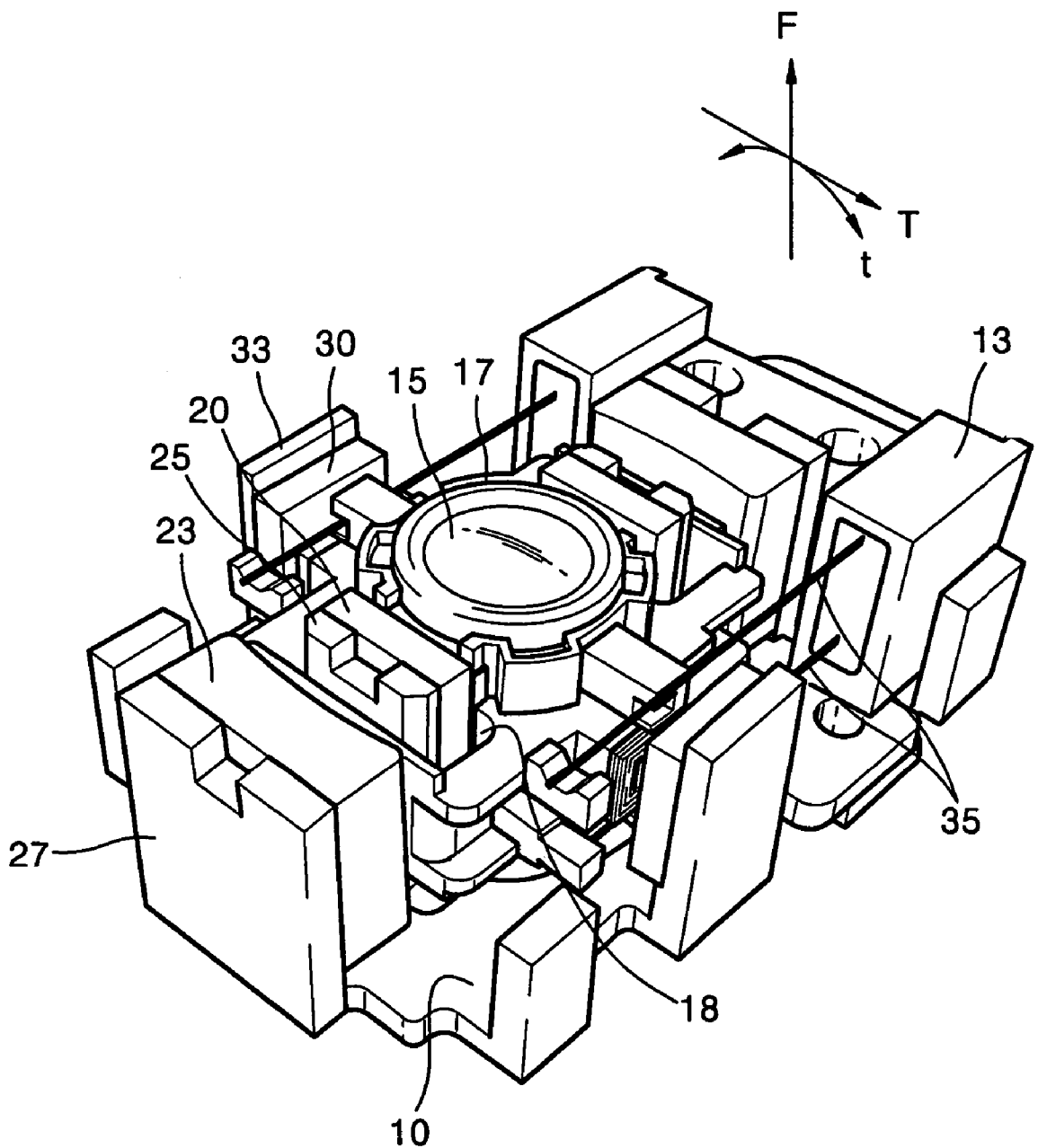
FIG. 1 is a perspective view of a conventional optical pickup actuator.
Figure 2:
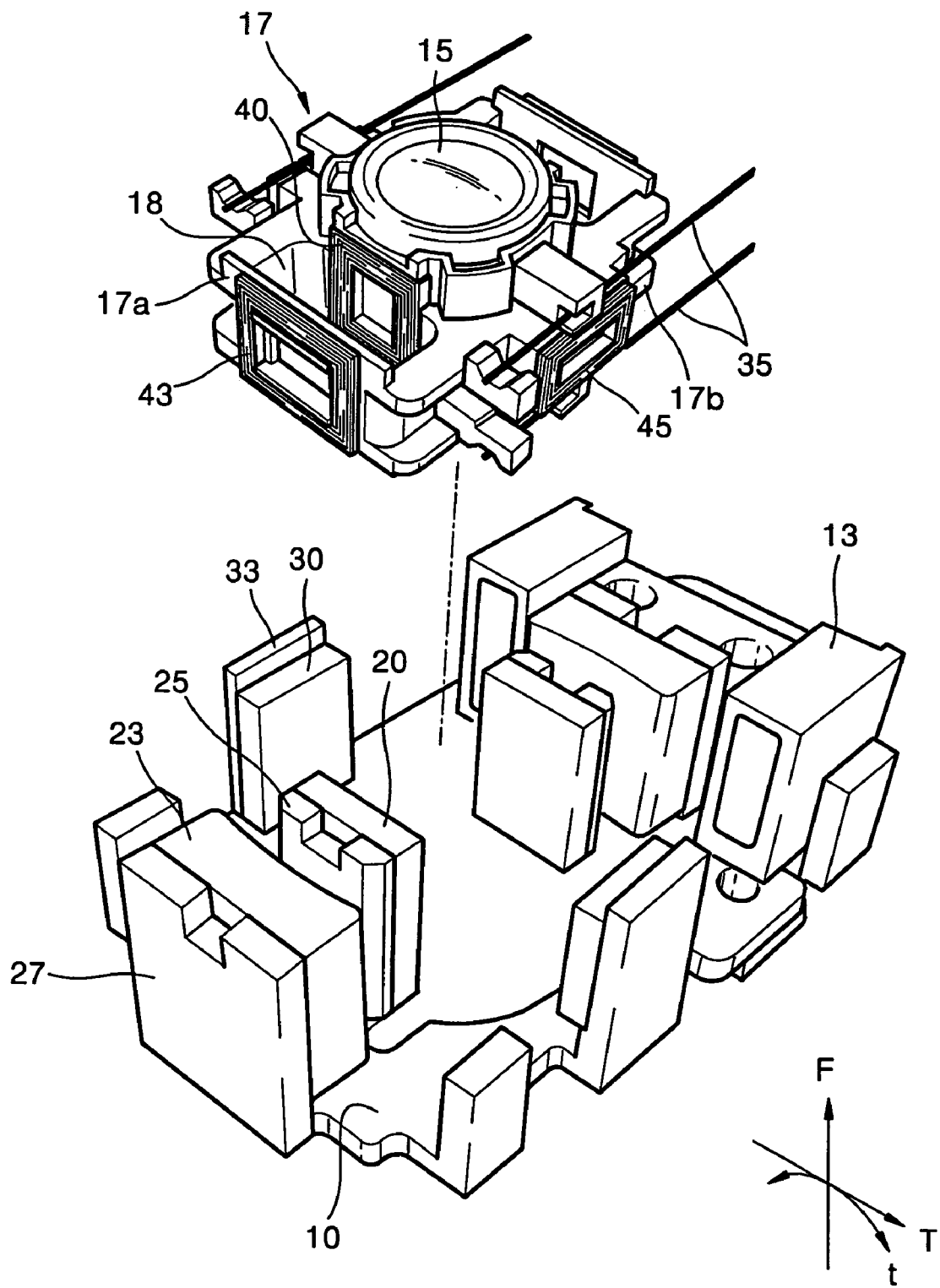
FIG. 2 is an exploded perspective view of the optical pickup actuator of FIG. 1.
Figure 3A:
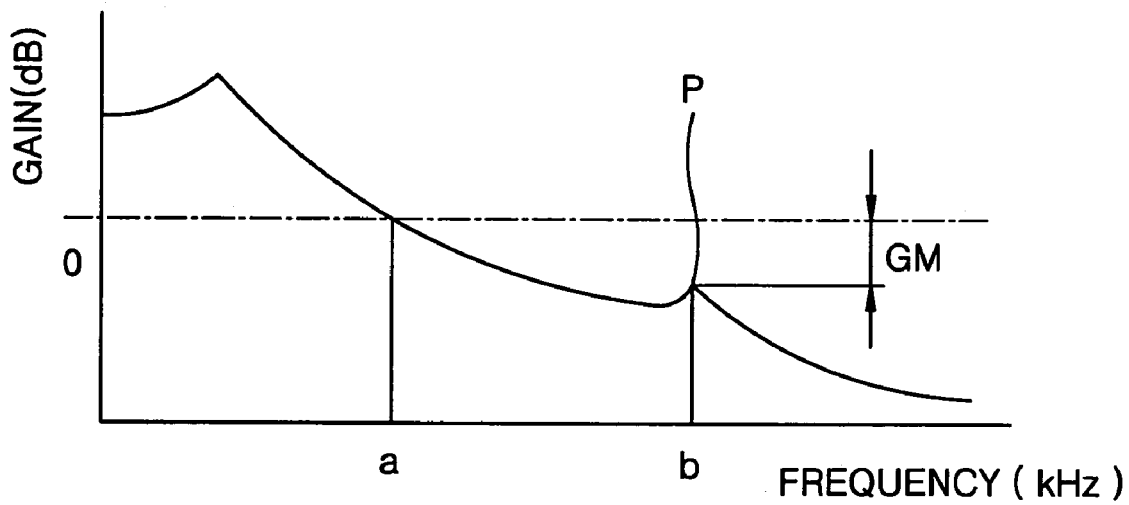
FIGS. 3A-3C are graphs of gain versus frequency in a conventional optical pickup actuator.
Figure 3B:
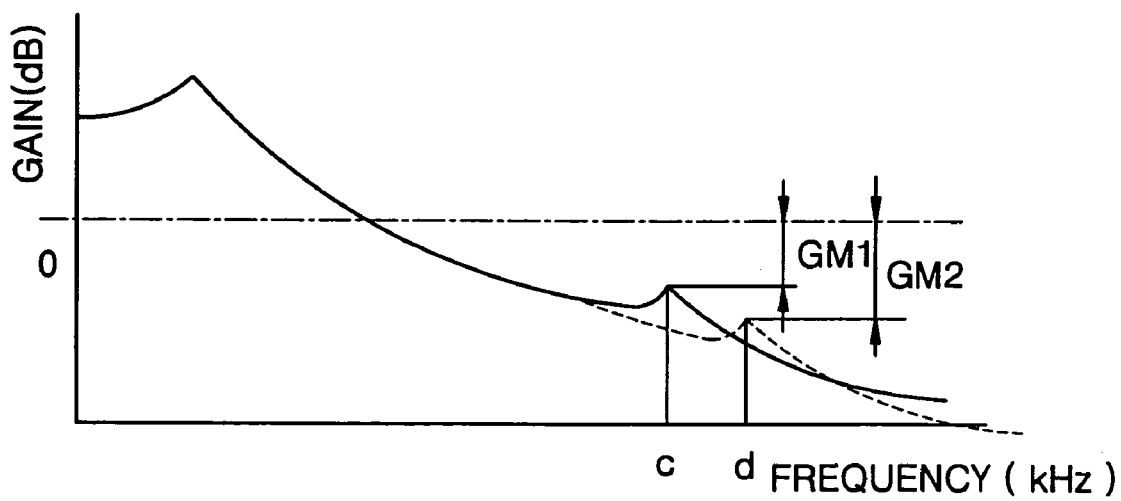
Figure 3C:
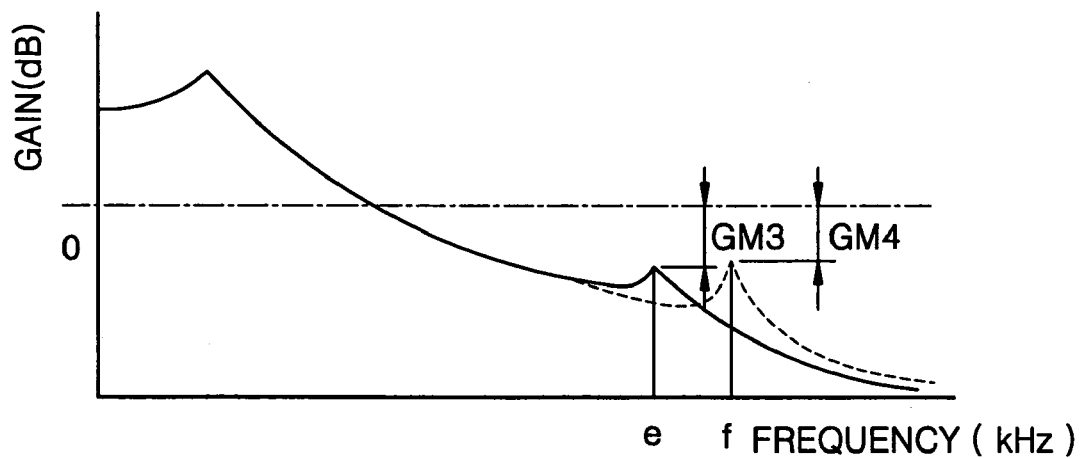
Figure 4A:
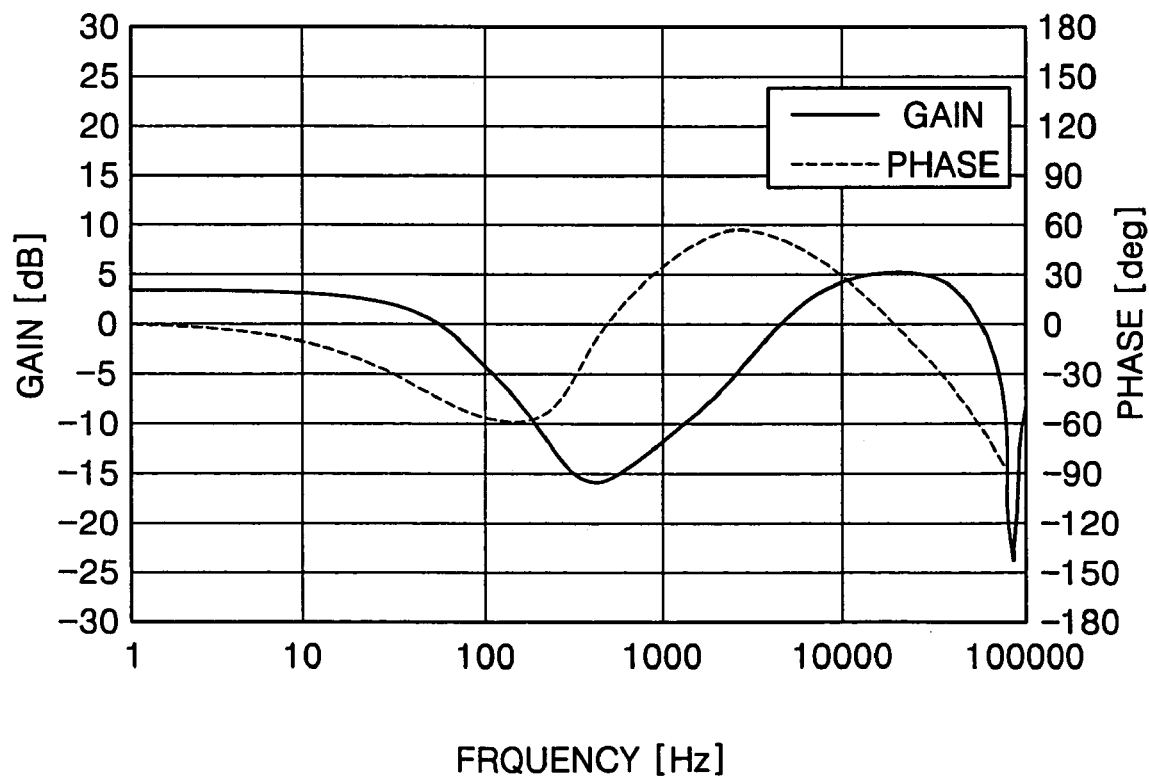
FIG. 4A is a design view of EQ of a conventional optical pickup actuator.
Figure 4B:
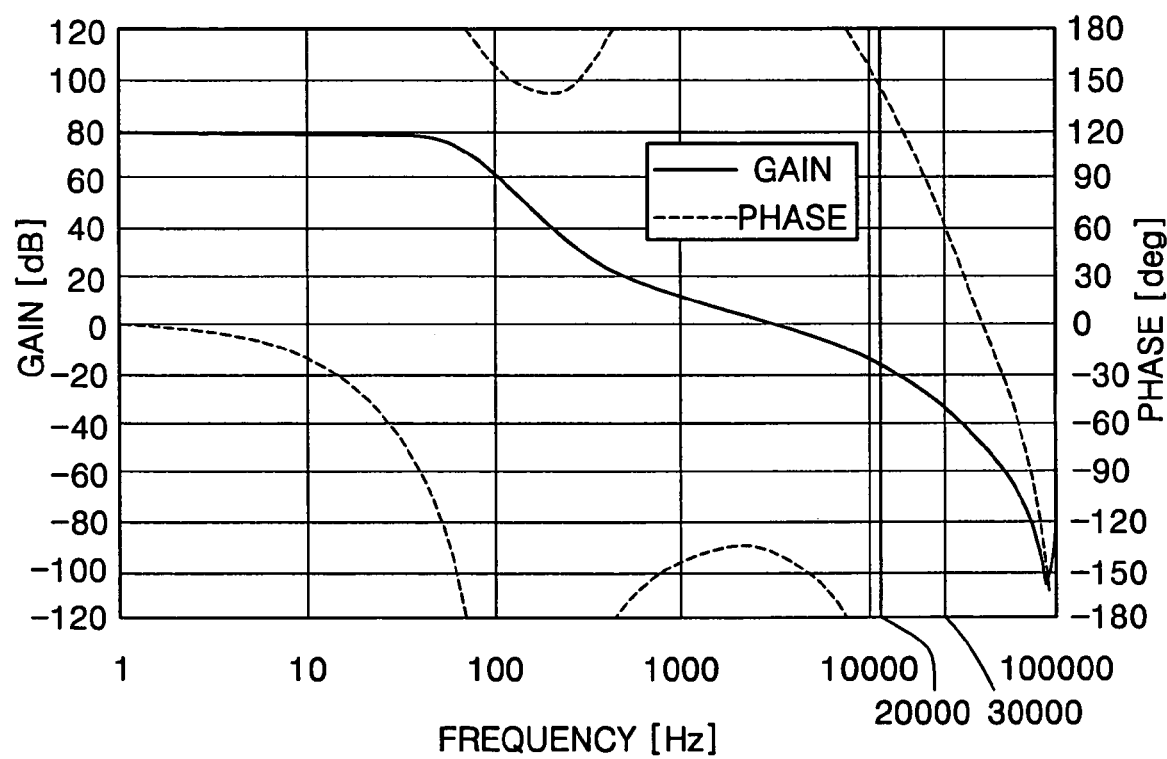
FIG. 4B shows a second resonant frequency band when phase compensation is performed in the conventional optical pickup actuator.
Figure 5A:
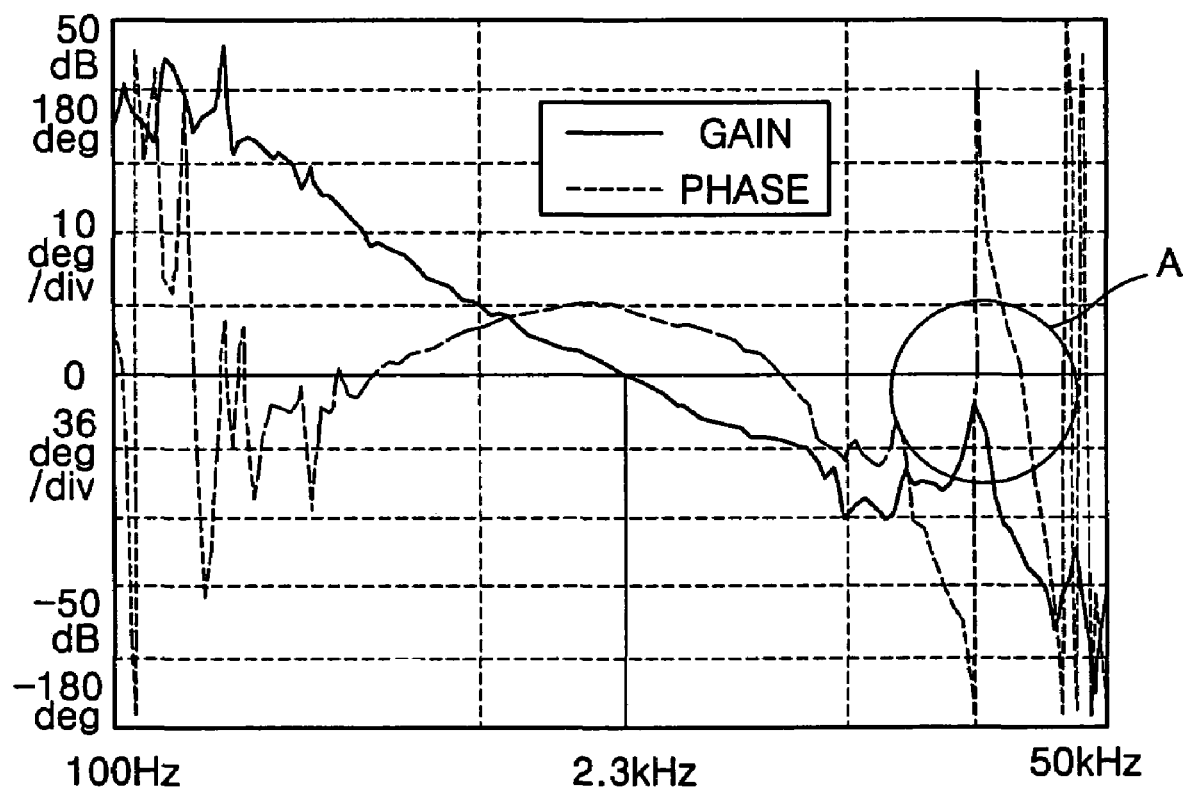
FIGS. 5A and 5B show a second resonant peak when a speed of a disc is increased.
Figure 5B:
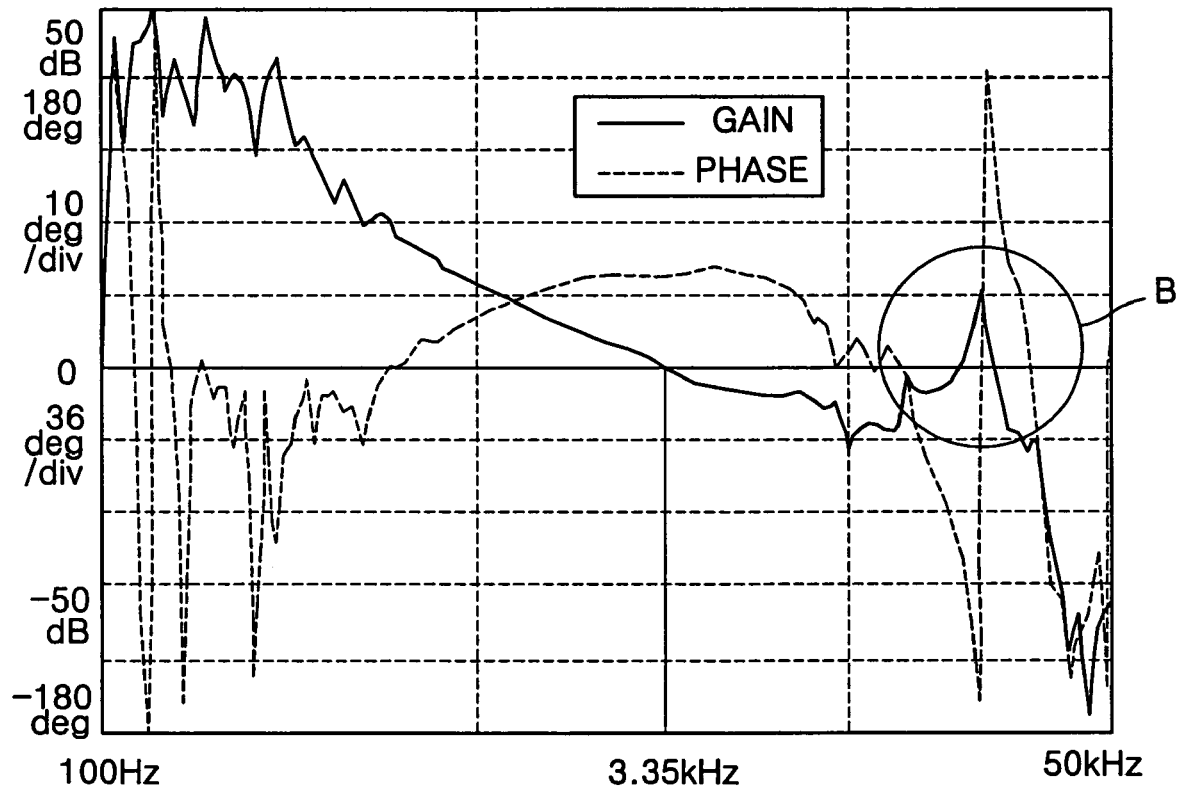

Reference will now be made in detail to embodiments of the present invention, examples of which are illustrated in the accompanying drawings, wherein like reference numerals refer to the like elements throughout. The embodiments are described below to explain the present invention by referring to the figures.

Figure 6:
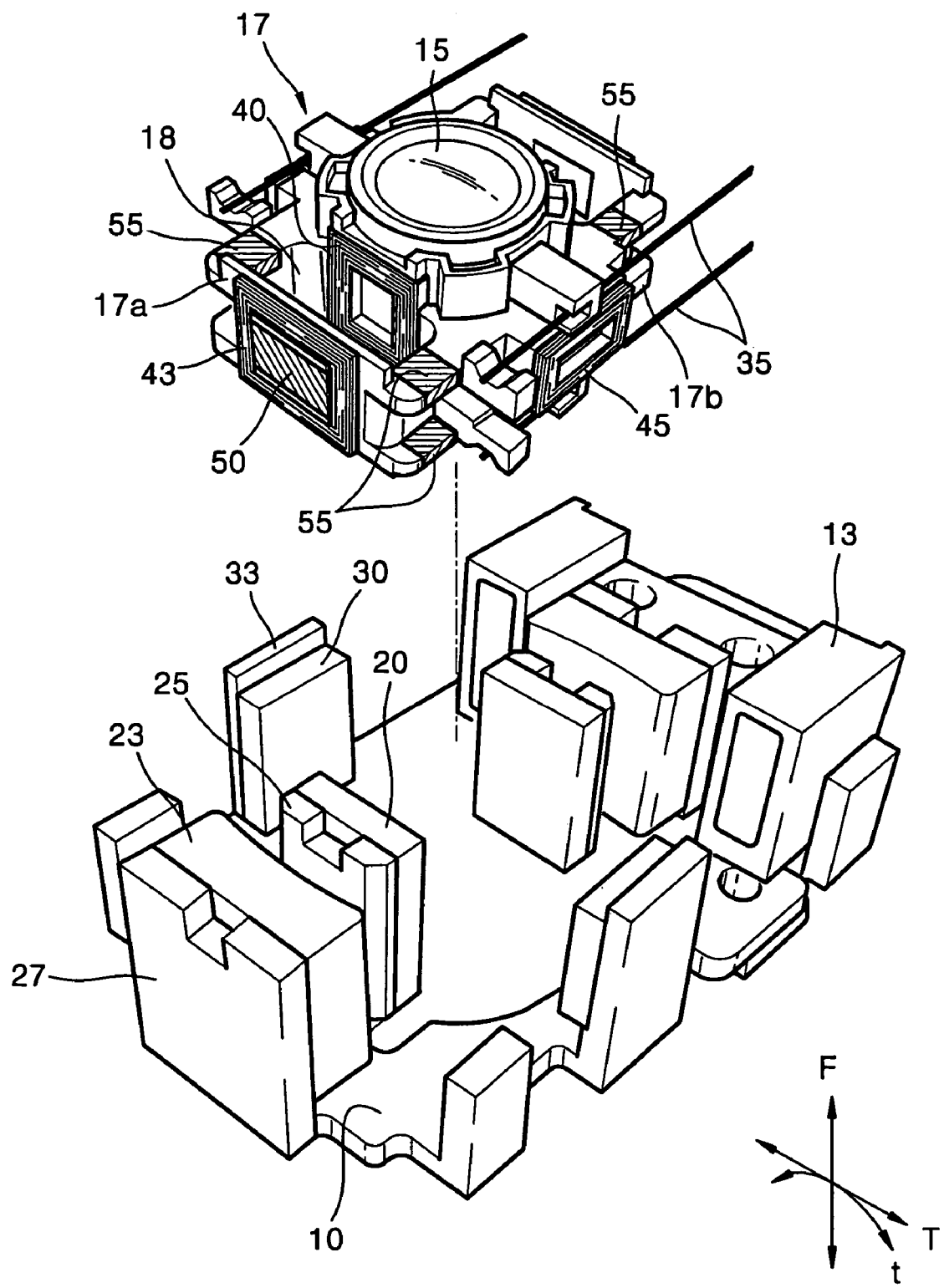
FIG. 6 is an exploded perspective view of an optical pickup actuator according to a first embodiment of the present invention.

Referring to FIG. 6, in an optical pickup actuator according to a first embodiment of the present invention, a holder 13 is formed at one side of a base 10, and a bobbin 17 on which an objective lens 15 is placed is mounted in a central portion of the base 10. The bobbin 17 is movably supported by suspension wires 35 that are fixed to the holder 13 at one end. Through-holes 18 are formed at both sides of the bobbin 17.

A magnetic driving unit is provided for driving the bobbin 40 in a focusing direction F, a tracking direction T, or a tilting direction t by an electromagnetic force. The magnetic driving unit includes tracking coils 40, focusing coils 43, tilting coils 45, a pair of first magnets 20 for interacting with the tracking coil 40, a pair of second magnet 23 for interacting with the focusing coils 43, and a pair of third magnets 30 for interacting with the tilting coils 45.

First and second yokes 25 and 27, respectively, which are separated from each other on the base 10 by a distance are provided. The bobbin 17 is disposed such that the first yoke 25 is inserted into the through-hole 18. The bobbin 17 is suspended by the suspension wires 35 and is guided by the first yoke 25 when the bobbin 17 is driven by the magnetic driving unit.

The first magnets 20 are attached to the first yokes 25, and the second magnets 23 are attached to the second yokes 27. The tracking coils 40 are wound around an inside wall of the through-hole 18 and are opposite to the first magnet 20. The focusing coils 43 are wound around an outer side wall 17a of the bobbin 17 opposite to the second magnet 23. The tilting coils 45 are wound around an outer side wall 17b of the bobbin 17 different from the outer side wall 17a around which the focusing coils 43 are wound. The third magnet 30 is provided to oppose the tilting coils 45. The third magnet 30 is attached to the third yoke 33.

The first to third yokes 25, 27, and 33, respectively, are integrally formed with the base 10, and help to shape a magnetic field formed by the first to third magnets 20, 23, and 30, respectively.

When current is supplied to the tracking coils 40, the focusing coils 43, or the tilting coils 45 via the suspension wires 35, the bobbin 17 is driven in the focusing direction F, the tracking direction T, or the tilting direction t by an interaction between the coils 40, 43, and 45 and the first to third magnets 20, 23, and 30.

Figure 7:
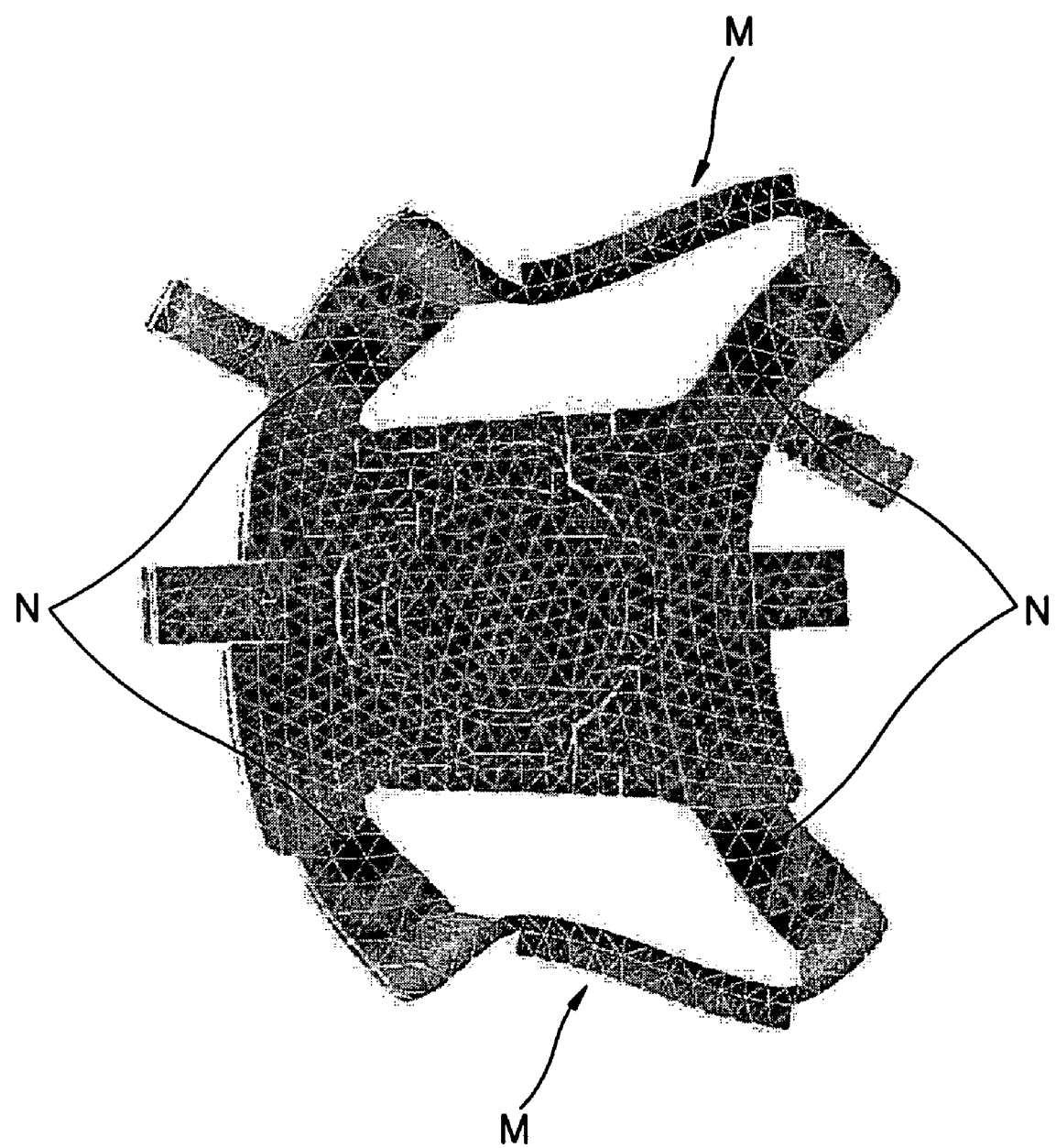
FIG. 7 shows a simulation result for measuring a largest change occurring portion in the optical pickup actuator according to the first embodiment of the present invention.

FIG. 7 shows a simulation result with respect to a largest change occurring portion when the optical pickup actuator is driven in the tracking direction T. In FIG. 7, the darker the color of a portion the larger changes of the actuator occur at this portion. It can be seen from FIG. 7 that the largest change occurring portions in the tracking drive are a portion M where the focusing coils 43 are disposed, and each of the corners N of the bobbin 17. It can be seen from the simulation results that the size of the second resonant peak is reducible by inserting a damping member at the largest change occurring portions M and N.

Referring back to FIG. 6, the first damping member 50 is inserted into a central portion of the focusing coils 43 and a second damping member 55 is inserted at each of the corners of the bobbin 17. The damping effect is increased by mixing a metallic heterogeneous material with the first and second damping members 50 and 55. A component obtained by mixing a metallic heterogeneous material with a damping member is referred to as a dynamic vibration absorber.

Figure 8A:
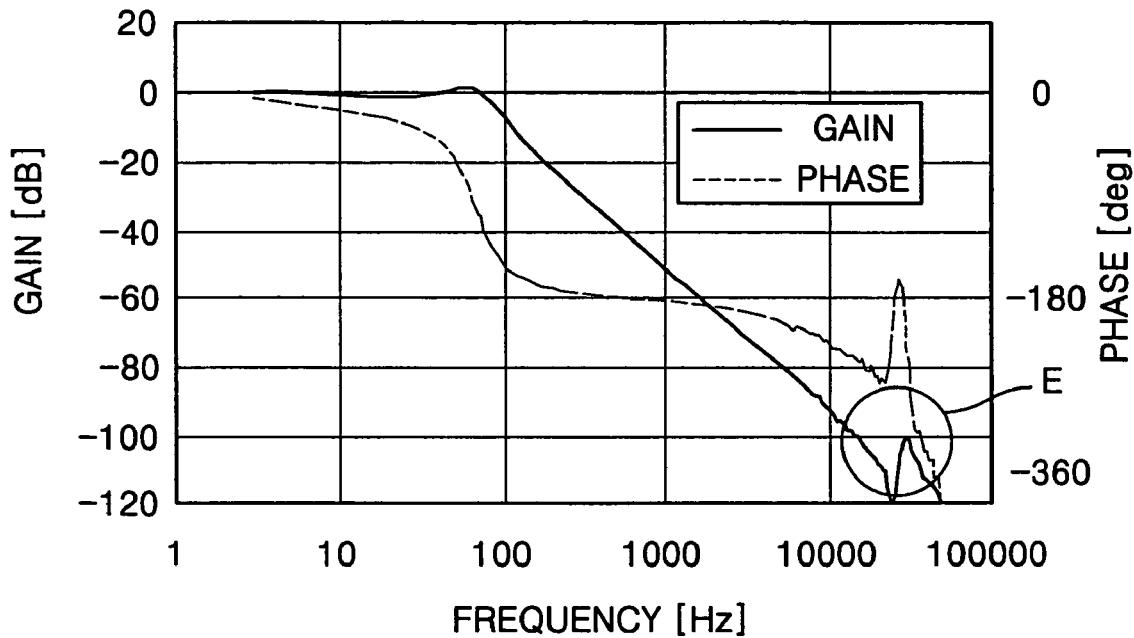
FIG. 8A is a graph of gain and phase versus frequency in a 32× optical pickup actuator according to the first embodiment of the present invention.
Figure 8B:
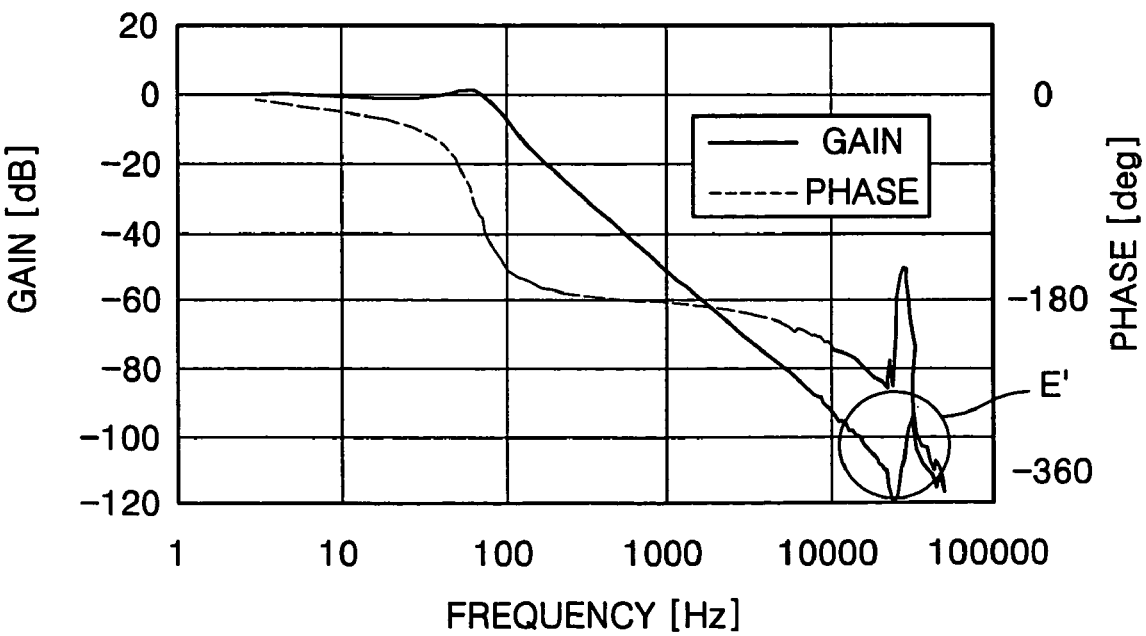
FIG. 8B is a graph of gain and phase versus frequency in a conventional 32× optical pickup actuator.

FIG. 8A is a graph of gain and phase versus frequency after inserting the first and second damping members 50 and 55 (shown in FIG. 6) into a 32× optical pickup actuator, and FIG. 8B is a graph of gain and phase versus frequency before inserting the first and second damping members 50 and 55 into the 32× optical pickup actuator.

In FIGS. 8A and 8B, E and E' denote a second resonant peak. Comparing FIG. 8A with FIG. 8B, the second resonant peak E after inserting the first and second damping members 50 and 55 (shown in FIG. 6) is shown to be smaller than the second resonant peak E' before inserting the first and second damping members 50 and 55. A gain margin in FIG. 8A is shown to be increased by a difference between the second resonant peaks E and E'.

Figure 9A:
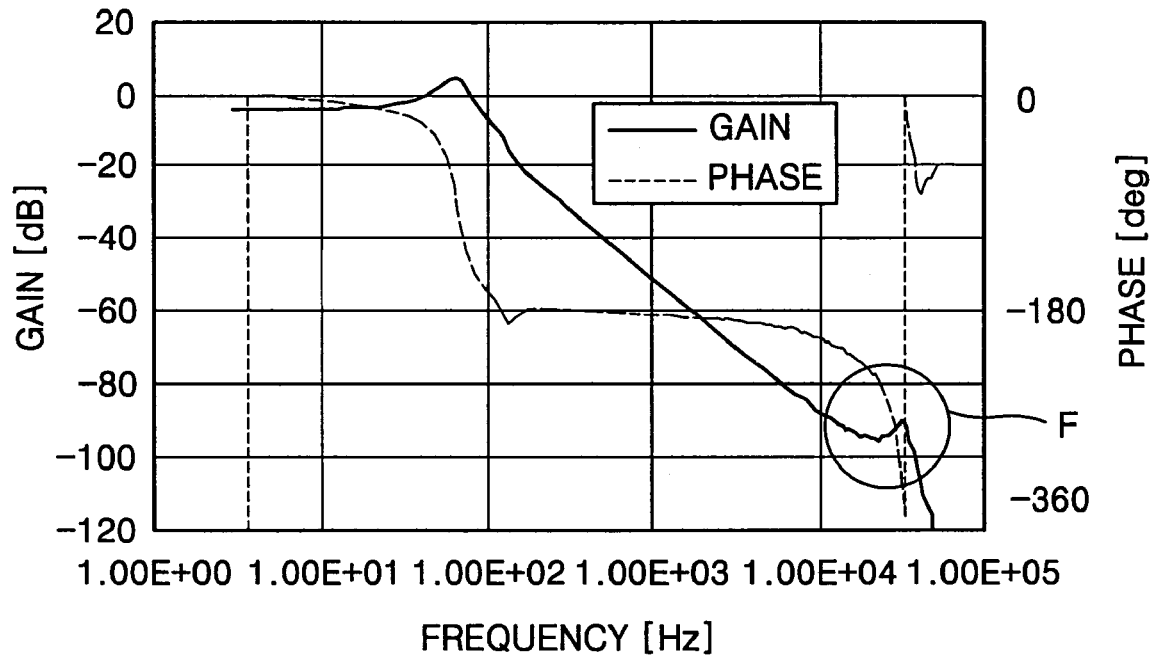
FIG. 9A is a graph of gain and phase versus frequency in an 8× optical pickup actuator according to the first embodiment of the present invention.
Figure 9B:
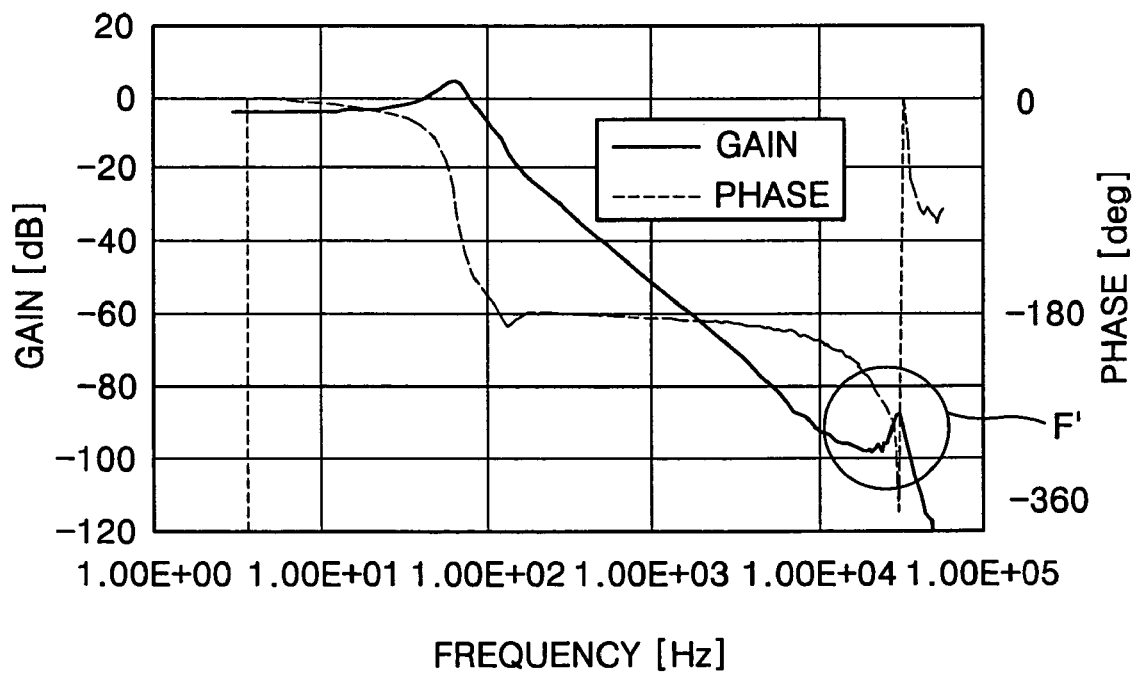
FIG. 9B is a graph of gain and phase versus frequency in a conventional 8× optical pickup actuator.

FIG. 9A is a graph of gain and phase versus frequency after inserting the first and second damping members 50 and 55 (shown in FIG. 6) into an 8× optical pickup actuator, and FIG. 9B is a graph of gain and phase versus frequency before inserting the first and second damping members 50 and 55 into the 8× optical pickup actuator. As in FIGS. 8A and 8B, a second resonant peak F of FIG. 9A after inserting the first and second damping members 50 and 55 is shown to be smaller than a second resonant peak F' of FIG 9B before inserting the first and second damping members 50 and 55. Consequently, a gain margin in FIG. 9A is shown to be increased. It can be seen from these simulation results that the optical pickup actuator according to the first embodiment of the present invention has an effect when used with high-speed recording media.

Figure 10:
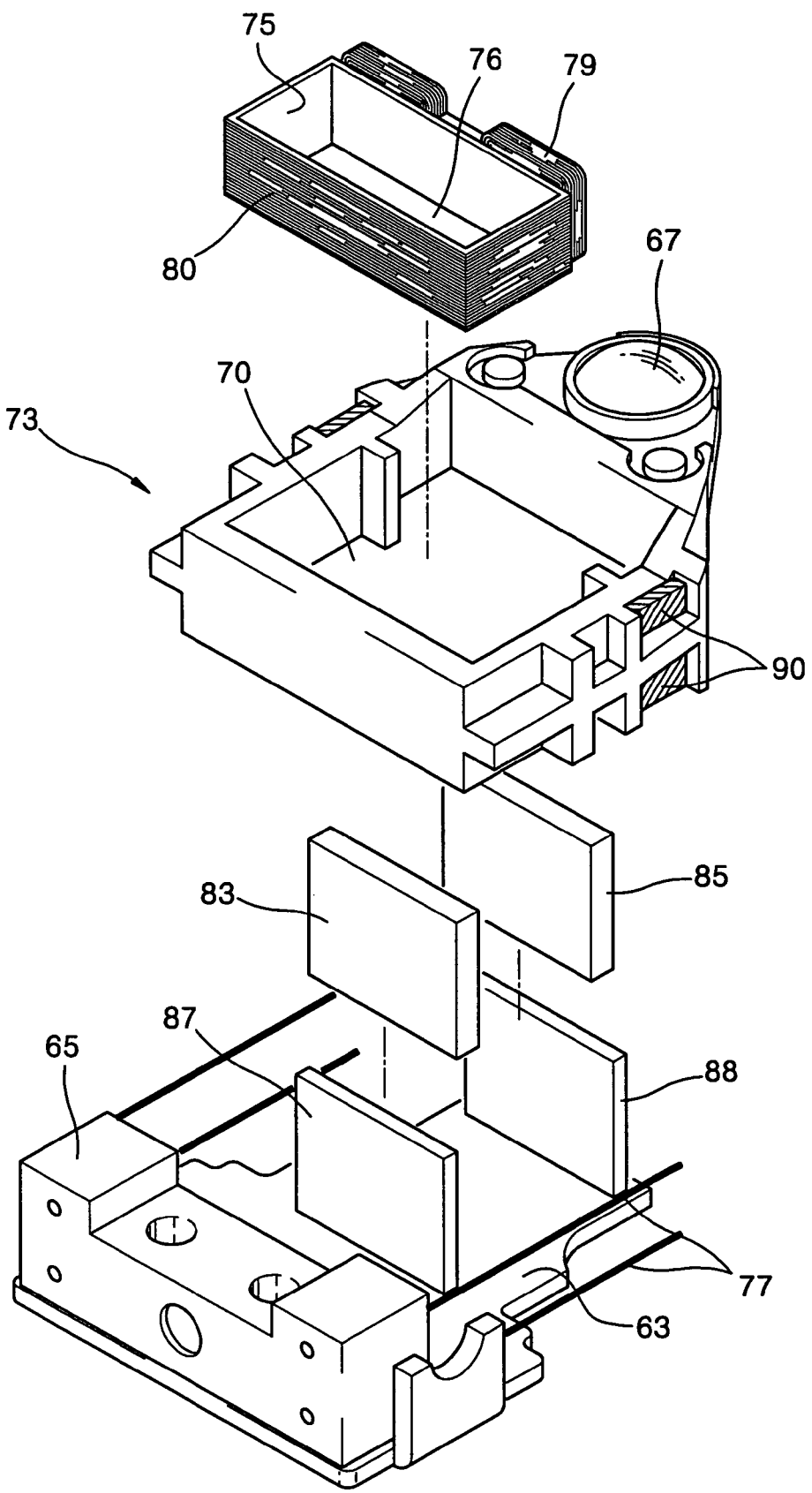
FIG. 10 is an exploded perspective view of an optical pickup actuator according to a second embodiment of the present invention.
Figure 11:
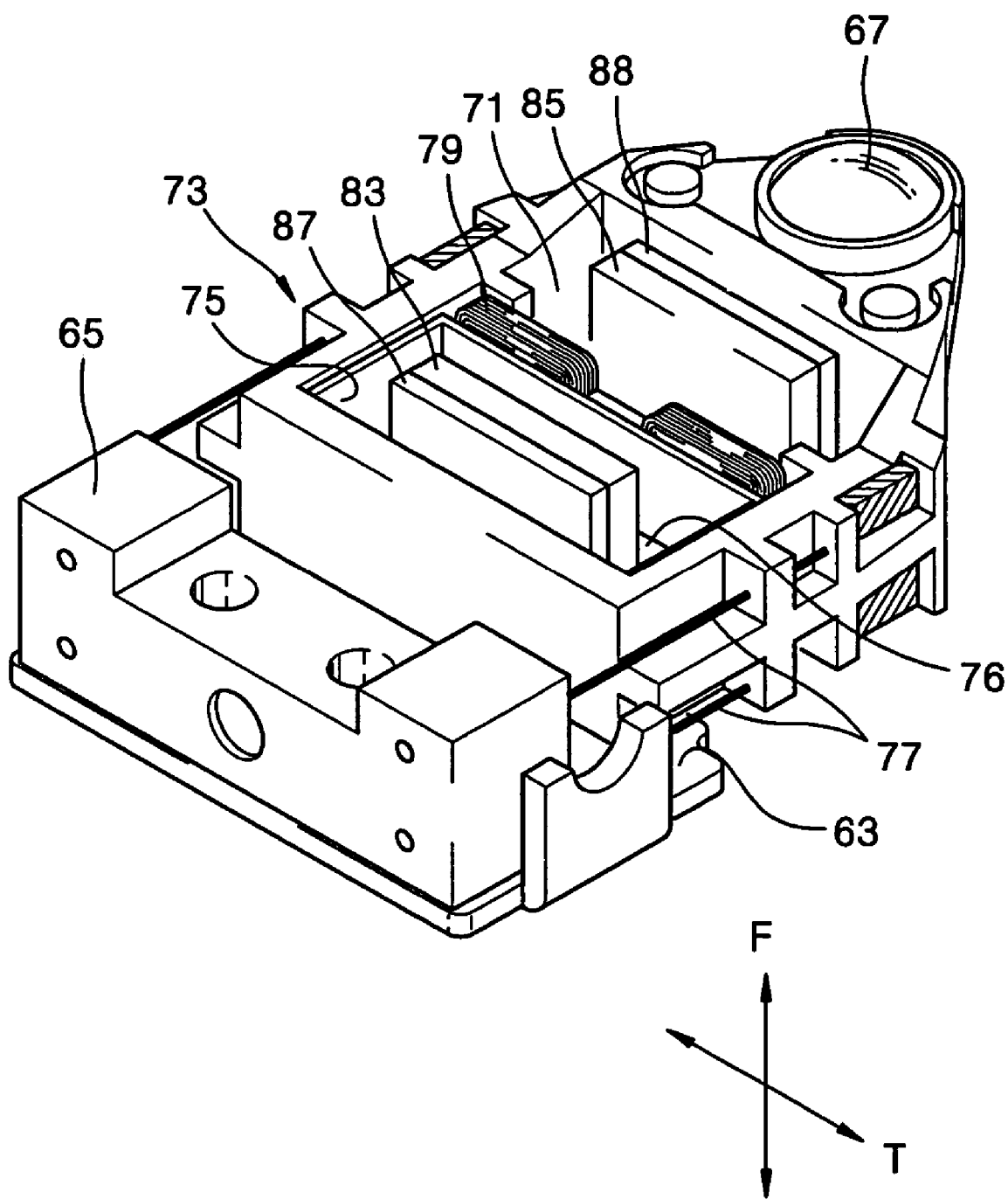
FIG. 11 is a perspective view of the optical pickup actuator of FIG. 10.

An optical picked actuator according to a second embodiment of the present invention will be described in detail with concurrent reference to FIGS. 10 and 11.

In an optical pickup actuator according to the second embodiment of the present invention, a holder 65 is formed at one side of a base 63, and a moving unit 73 with an objective lens 67 placed at one side and a receiving hall 70 formed in a middle portion thereof is provided. A bobbin 75 is received in the receiving hall 70 so that the bobbin 75 and the moving unit 73 move together. A magnetic driving unit is provided for performing a focusing operation and a tracking operation of the moving unit 73. The bobbin 75 includes a first guide hole 76 and is formed in a hollow shape.

The magnetic driving unit includes tracking coils 79 which are wound around one outer sidewall of the bobbin 75, focusing coils 80 which are wound around the bobbin 75, and first and second magnets 83 and 85, respectively, which are disposed at both sides of the tracking coils 79. The first and second magnets 83 and 85, respectively, are attached to first and second yokes 87 and 88, respectively, which are formed in an integrated body on the base 63. When the bobbin 75 is received in the receiving hall 70, the bobbin 75 is disposed such that the tracking coils 79 are disposed at a center portion of the receiving hall 70. Here, the bobbin 75 includes the first guide hole 76, and a second guide hole 71 is formed in a remaining space of the receiving hall 70 after the bobbin 75 is received in the receiving hall 70.

The first yoke 87 and the first magnet 83 are received in the first guide hole 76, and the second yoke 88 and the second magnet 85 are received in the second guide hole 71.

The moving unit 73 is supported by suspension wires 77 which are fixed to the holder 65 at one end. The suspension wires 77 elastically support the moving unit 73 and the bobbin 75 to perform the tracking operation and the focusing operation of the moving unit 73 and the bobbin 75, and also supply current to the magnetic driving unit.

When current is supplied to the magnetic driving unit via the suspension wires 77, the moving unit 73 moves in a tracking direction T by an interaction between the first and second magnets 83 and 85 and the tracking coils 79. Further, the moving unit 73 moves in a focusing direction F by an interaction between the first and second magnets 83 and 85 and the focusing coils 80.

Figure 12A:
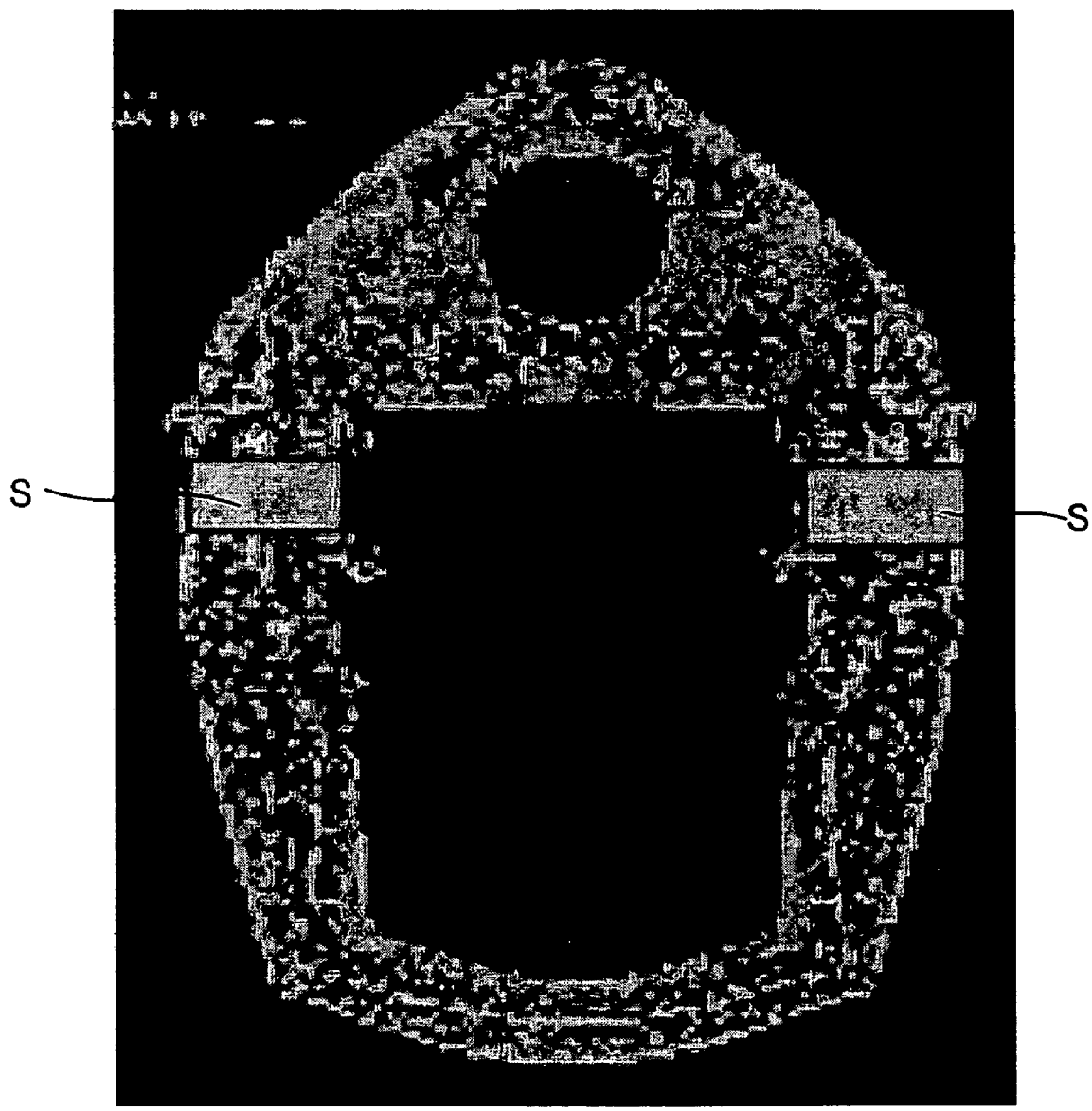
FIGS. 12A through 12C show simulation results for measuring a largest change occurring portion in the optical pickup actuator according to the second embodiment of the present invention.
Figure 12B:
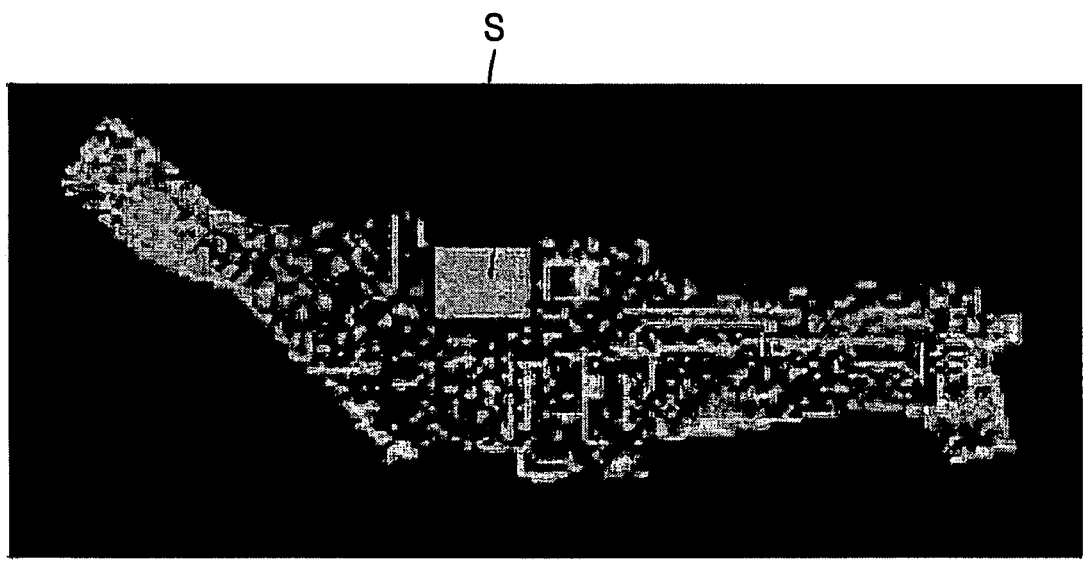
Figure 12C:
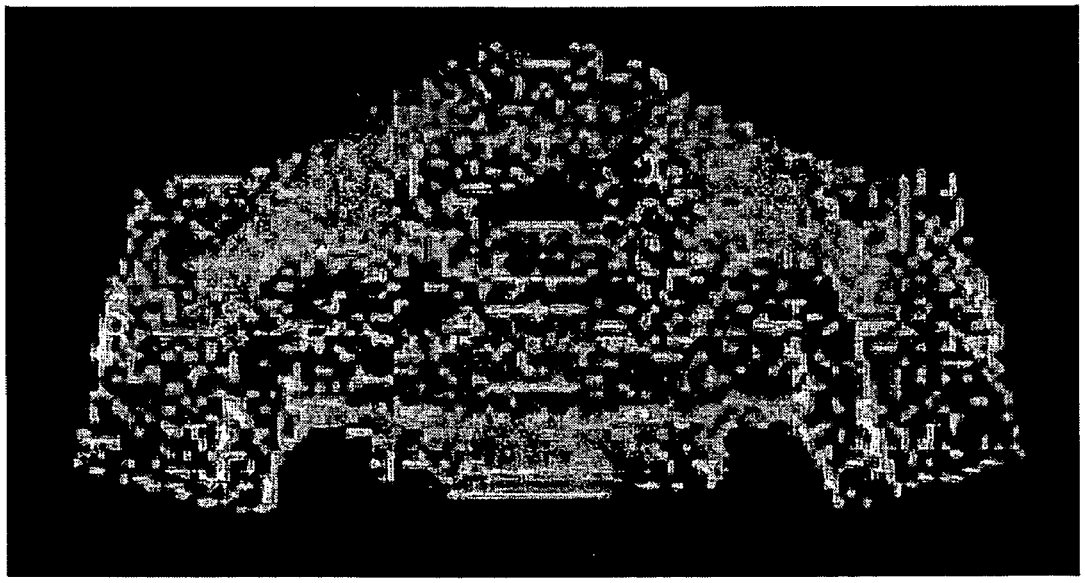

The optical pickup actuator, in which the objective lens 67 is formed not in the center portion but at one side thereof, is referred to as an asymmetric actuator. FIGS. 12A through 12C show simulation results for measuring a largest change occurring position of the asymmetric actuator when the asymmetric actuator is driven in the tracking direction T. FIG.

12A is a plan view of the asymmetric actuator, FIG. 12B is a side view, and FIG. 12C is a front view. In FIGS. 12A through 12C, the darker the color of a portion the more frequently changes of the actuator occur at this portion.

It can be seen from FIG. 12A that changes of the actuator occur most frequently at shoulder portions S of both sides of the moving unit 73. Thus, as shown in FIG. 10, the size of a second resonant peak is reducible in driving the asymmetric actuator by inserting a damping member 90 at the shoulder portions S of the moving unit 73. Furthermore, vibration is reducible by a dynamic vibration absorber obtained by mixing a metallic heterogeneous material with the damping member 90. As described in the first embodiment, a gain margin of the actuator is increasible by reducing the size of the second resonant peak.

As described above, an optical pickup actuator according to the present invention reduces the size of a second resonant peak and increases a gain margin of the actuator by inserting a damping member at a position determined by experiment or simulation. Therefore, stability of the optical pickup actuator is improved and high-speed optical recording can be performed better.

The present invention uses a method of reducing the size of the second resonant peak instead of a method of increasing a second resonance frequency, in order to stabilize the optical pickup actuator. This is because the method of reducing the size of the second resonant peak can be performed more easily than the method of increasing the second resonance frequency, by inserting a damping member at a portion without changing the structure of the actuator so that the size of the second resonant peak, and also vibration of the actuator, can be reduced.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. An optical pickup actuator for driving, via a magnetic driving unit, in focusing, tracking, and tilting directions, a bobbin on which an objective lens is disposed, comprising
at least one damping member disposed at a position where great changes in the optical pickup actuator occur when the magnetic driving unit drives the bobbin in one of the focusing, tracking, and tilting directions, so that a size of a second resonant peak is reduced,
wherein the magnetic driving unit includes:
first magnets disposed at opposing sides of the bobbin, respectively;
tracking coils which are wound around the bobbin to oppose respective ones of the first magnets;
second magnets which are spacedly disposed from respective ones of the first magnets, respectively; and
focusing coils which are wound between the first magnets and the second magnets, and
wherein a first damping member is inserted within an entire center portion of the focusing coils and surrounded thereby,
wherein the bobbin has corners and second damping members are respectively disposed at each corner.

2. The optical pickup actuator of claim 1, wherein a metallic heterogeneous material is mixed with the second damping member.

3. The optical pickup actuator of claim 1, wherein a metallic heterogeneous material is mixed with the first damping member.

4. The optical pickup actuator of claim 1, wherein the bobbin has corners and at least one of the at least one damping member is disposed at each corner.

5. The optical pickup actuator of claim 1, wherein a metallic heterogeneous material is mixed with the at least one damping member.

6. The optical pickup of claim 1, wherein the bobbin is movably supported by plural suspension wires.

7. The optical pickup actuator of claim 1, further comprising:
first yokes to which the first magnets are respectively attached;
second yokes to which the second magnets are respectively attached; and
third yokes to which third magnets are respectively attached.

8. An optical pickup actuator comprising:
a base;
a moving unit in which an objective lens is disposed at a side thereof and having a receiving hole at a center thereof;
damping members inserted above and below shoulder portions of both sides of the receiving hole near the objective lens so that a size of a second resonant peak is reduced;
a bobbin which is receivable in the receiving hall so as to move together with the moving unit; and
a magnetic driving unit disposed in the base and which drives the moving unit in focusing, tracking, and tilting directions,
wherein the magnetic driving unit includes;
focusing coils which are wound around the bobbin;
tracking coils which are wound around a side of the bobbin and are disposed at the center portion of the receiving hall; and
first and second magnets disposed at sides of the tracking coils.

9. The optical pickup actuator of claim 8, wherein a metallic heterogeneous material is mixed with the damping member.

10. The optical pickup actuator of claim 8, wherein a metallic heterogeneous material is mixed with the damping member.

11. The optical pickup of claim 8, wherein the bobbin is movably supported by plural suspension wires.

12. The optical pickup apparatus of claim 11, wherein the receiving hall has shoulders at opposing sides thereof, and wherein the at least one location where changes of the actuator occur most frequently are the shoulders.

13. The optical pickup of claim 11, further comprising:
a first yoke to which the first magnet is attached; and
a second yoke to which the second magnet is attached.

14. The optical pickup of claim 13, wherein the bobbin includes a first guide hole, the receiving hall includes a second guide hole, and the first and second yokes are respectively received by the first and second guide holes.

15. A method of reducing a frequency of a second resonance peak of an optical pickup, comprising
inserting at least one damping member in at least one location of the optical pickup where great change occurs during tracking, the at least one location being an entire center of the focusing coils of the optical pickup so that the at least one damping member is surrounded by the focusing coils or in each corner of the bobbin of the optical pickup;

damping vibration of the optical pickup during tracking at the at least one location where the great change occurs during the tracking, via the at least one damping member, wherein the damping includes at least one of damping vibration at a center of focusing coils of the optical pickup and damping the vibration at corners of a bobbin of the optical pickup.

16. The method of claim 15, wherein the damping member is mixed with a metallic heterogeneous material.

17. A method of increasing a gain margin of an optical pickup, comprising reducing a frequency of a second resonance peak of an optical pickup by damping vibration of the optical pickup during tracking at least one location where great change occurs during the tracking, by damping vibration at a center of focusing coils of the optical pickup by inserting at least one damping member in the entire center of the focusing coils so that the at least one damping member is surrounded by the focusing coils or damping vibration at corners of a bobbin of the optical pickup by inserting at least one damping member in each corner of the bobbin.

18. The method of claim 17, wherein the damping member is mixed with a metallic heterogeneous material.

* * * * *

UNITED STATES PATENT AND TRADEMARK OFFICE
CERTIFICATE OF CORRECTION

PATENT NO.           : 7,458,087 B2                                                                 Page 1 of 1
APPLICATION NO.  : 10/706949
DATED                    : November 25, 2008
INVENTOR(S)         : Byung-youn Song et al.

It is certified that error appears in the above-identified patent and that said Letters Patent is hereby corrected as shown below:

On the Title Page, Column 1 (Foreign Application Priority Data), Line 1, change "Nov. 15, 2002      (JP)      ................................... 10-2002-071040" to --Nov. 15, 2002      (KR)      ................................... 10-2002071040--.

On the Title Page, Column 2 (U.S. Patent Documents), Line 9, change "Mori et al" to --Mori et al.--.

On the Title Page, Column 2 (Foreign Patent Documents), Line 2, change "9/1996" to --8/1996--.

Signed and Sealed this

Seventeenth Day of March, 2009

JOHN DOLL
*Acting Director of the United States Patent and Trademark Office*